United States Patent
Mansour et al.

(10) Patent No.: US 11,165,528 B1
(45) Date of Patent: Nov. 2, 2021

(54) USE OF ORTHOGONAL CODING TO FACILITATE USE OF SHARED FREQUENCY RESOURCE FOR DUAL-RAT TRANSMISSION TO A USER EQUIPMENT DEVICE

(71) Applicant: Sprint Spectrum L.P., Overland Park, KS (US)

(72) Inventors: Nagi Mansour, Arlington, VA (US); Akin Ozozlu, Mclean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/556,529

(22) Filed: Aug. 30, 2019

(51) Int. Cl.
| | |
|---|---|
| *H04J 13/12* | (2011.01) |
| *H04W 76/15* | (2018.01) |
| *H04J 13/00* | (2011.01) |
| *H04W 72/04* | (2009.01) |
| *H04J 13/14* | (2011.01) |

(52) U.S. Cl.
CPC .......... *H04J 13/12* (2013.01); *H04J 13/0048* (2013.01); *H04J 13/14* (2013.01); *H04W 72/0453* (2013.01); *H04W 72/0466* (2013.01); *H04W 76/15* (2018.02)

(58) Field of Classification Search
CPC ........ H04J 13/12; H04J 13/0048; H04J 13/14; H04W 76/15; H04W 72/0453; H04W 72/0466
See application file for complete search history.

(56) References Cited

U.S. PATENT DOCUMENTS

| | | | |
|---|---|---|---|
| 8,837,271 B1 * | 9/2014 | Mansour | H04J 13/18 370/208 |
| 9,622,233 B1 | 4/2017 | Mansour et al. | |
| 2020/0245343 A1 * | 7/2020 | Kim | H04L 1/1854 |

OTHER PUBLICATIONS

K. Singhal, "Walsh Codes, PN Sequences and their role in CDMA Technology," Term Paper—EEL 201, 2012.

\* cited by examiner

*Primary Examiner* — Elton Williams

(57) ABSTRACT

A method and system for concurrent transmission of (i) a first bit sequence from a first access node to a UE and (ii) a second bit sequence from a second access node to the UE, when the first access node serves the UE on a first carrier according to a first radio access technology (RAT), the second access node serves the UE on a second carrier according to a second RAT, and the first and second carriers overlap in frequency. Per the disclosure, the access nodes could orthogonally encode their respective bit sequences and could concurrently transmit the resulting encoded bit sequences to the UE on the same frequency as each other.

18 Claims, 4 Drawing Sheets

USE OF ORTHOGONAL CODING TO FACILITATE USE OF SHARED FREQUENCY RESOURCE FOR DUAL-RAT TRANSMISSION TO A USER EQUIPMENT DEVICE

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access-bearer that extends between the access node and a core-network gateway system providing connectivity with a transport network and a data-radio-bearer (DRB) that extends over the air between the access node and the UE.

Once the UE is connected and attached, the access node could then serve the UE with packet-data communications.

On the downlink, for instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe on the carrier for carrying at least some of the data to the UE. And in that subframe, the access node could transmit to the UE a scheduling directive (e.g., a downlink control information (DCI) message) that indicates which PRBs will carry the data, and the access node could transmit the data to the UE in those PRBs.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) on a 4G carrier concurrently with the 5G radio being served by a 5G access node (next generation Node-B (gNB)) on a 5G carrier. This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just 4G LTE for instance.

In some dual-connectivity arrangements, an access node operating under a first RAT could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB). These access nodes could be collocated in a common cell site, possibly sharing an antenna tower, and could be configured to provide coverage in generally the same direction and of generally the same scope as each other. Alternatively, the access nodes could be at separate cell sites but still configured to provide substantially overlapping or coterminous coverage.

When the UE enters into coverage of such a system, the UE could initially scan for coverage under the first RAT and discover threshold strong coverage of the MN on a first-RAT carrier, and the UE could responsively engage in signaling as discussed above to establish for the UE an RRC connection. Further, the UE could engage in attach signaling with a core-network controller, via the UE's established RRC connection, and the core-network controller and MN could coordinate establishment for the UE of an access bearer and DRB as noted above. Here, the DRB and/or other service parameters that the MN configures to support the MN's air-interface service of the UE could define for the UE a first-RAT connection.

The MN could then serve the UE in a first-RAT stand-alone mode (i.e., under just the first RAT) with packet-data communications as described above. For instance, when the core network has data to send to the UE, the data could flow to the MN, and the MN could schedule and provide transmission of the data to the UE on downlink PRBs of the first-RAT carrier, with the UE monitoring for scheduling directives and reading the data from those downlink PRBs.

In addition, the MN could engage in a process to coordinate setup of dual-connectivity for the UE, so that the UE can be served concurrently by the MN according to the first RAT and the SN according to the second RAT.

To do so in an example system, the MN could first engage in an SN-addition process to add for the UE a second-RAT connection with the SN on a second-RAT carrier, so that the MN and SN can then cooperatively provide the UE with dual-connectivity service over their respective connections with the UE. For instance, the MN could transmit to the SN an SN-addition request message, providing RRC and DRB configuration information and other information for the second-RAT connection, and the SN could then responsively allocate resources for the second-RAT connection and reply to the MN an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then engage in random-access signaling with the SN so as to complete establishment of the second-RAT connection for the UE.

In some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication on its respective carrier in the manner described above.

On the downlink, for instance, when the core-network gateway system receives data for transmission to the UE, a portion of that data could flow to the MN for transmission by the MN over the first-RAT carrier to the UE, and another portion of the data could flow to the SN for transmission by the SN over the second-RAT carrier to the UE. Each access node could then schedule and provide transmission of its respective portion of the data to the UE on downlink PRBs of its respective carrier, with the UE monitoring for scheduling directives and reading the data from those downlink PRBs. Thus, the UE could concurrently receive a transmission of some of the data on PRBs of the first-RAT carrier from the MN and a transmission of other of the data on PRBs of the second-RAT carrier from the SN.

In a representative dual-connectivity implementation, the first-RAT connection and second-RAT connection would occupy different carriers than each other. These carriers could be FDD or TDD as noted above and would be mutually exclusive and thus non-overlapping in RF spectrum. On at least the downlink, for instance, each carrier could occupy a separate and distinct range of RF spectrum and thus define a respective set of PRBs separate and distinct from the PRBs of each other carrier. With this arrangement, each access node could safely schedule transmission to the UE on PRBs of its respective carrier without the risk of those PRBs overlapping with PRBs on which the other access node transmits concurrently to the UE on the its respective carrier.

One challenge of this arrangement is that an operator of the MN and SN may need to have sufficient RF spectrum in which to separately define the first-RAT carrier and the second-RAT carrier. Unfortunately, however, licensing costs or other issues may make this undesirable or impractical. Therefore, an improvement is desired.

In accordance with the present disclosure, the MN and SN will be configured to operate on respective first-RAT and second-RAT carriers that overlap at least partially in frequency with each other, and the MN and SN will concurrently transmit to the UE on the same frequency as each other. In particular, the MN and SN will concurrently transmit to the UE not just within the same frequency range as each other but on the same frequency as each other.

To facilitate this, the MN and SN will orthogonally encode their respective transmissions to the UE, with respective orthogonal codes, so that that the UE can uncover their respective transmissions upon receipt.

For instance, in a scenario where the MN has first data to send to the UE on the first-RAT carrier and the SN has second data to send to the UE on the second-RAT carrier, (i) the MN could orthogonally encode the first data with a first orthogonal code to produce first orthogonally encoded data and could transmit the first orthogonally encoded data to the UE on given frequency, and (i) the SN could orthogonally encode the second data with a second orthogonal code to produce second orthogonally encoded data and will concurrently transmit the second orthogonally encoded data to the UE on the same given frequency. Upon receipt of the combination of these concurrent transmissions on the given frequency, the UE could then apply the first orthogonal code to uncover the underlying first data and could apply the second orthogonal code to uncover the underlying second data.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
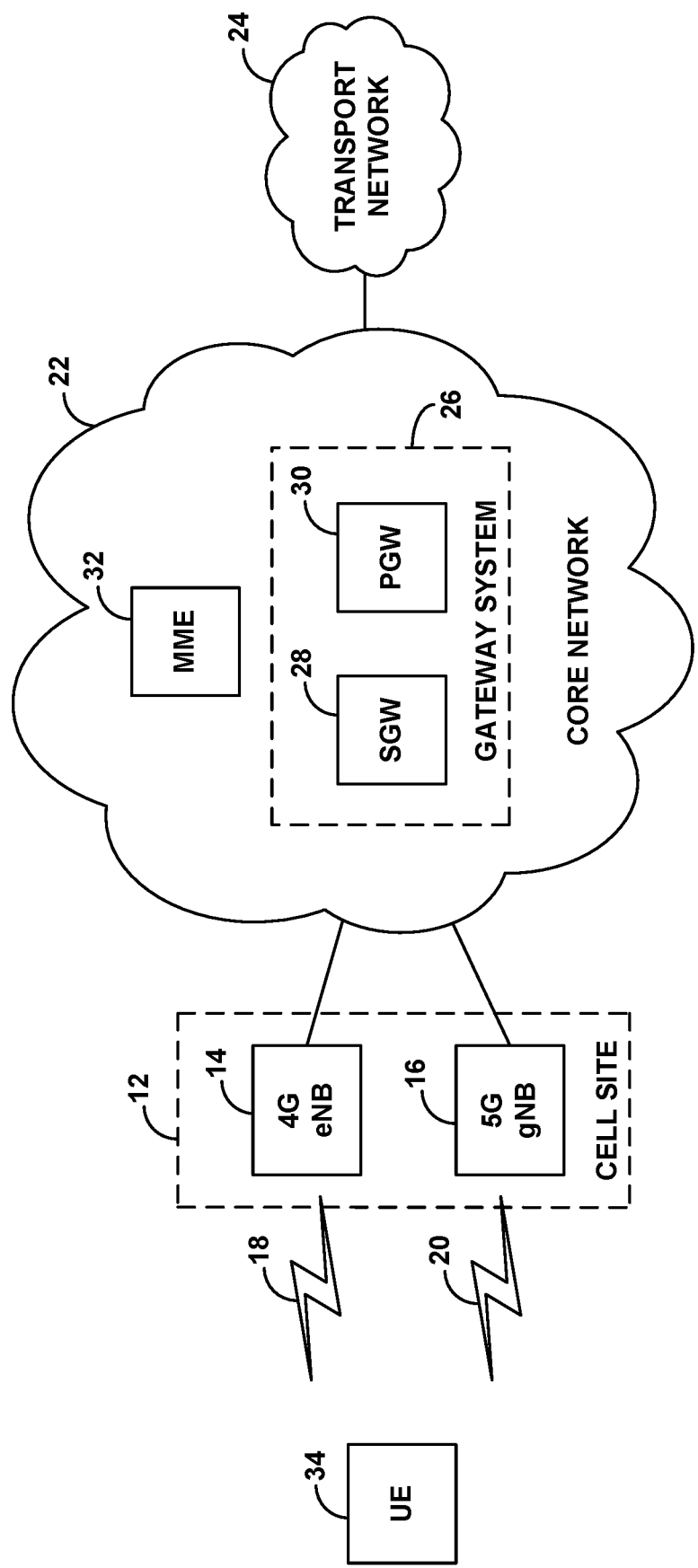
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage. Further, the access nodes could have respective antenna structures, which could be collocated with each other and configured to provide coverage of the same or similar direction and scope as each other, so that a UE could be served by both access nodes concurrently.

Each access node could be configured to provide coverage on at least one carrier according to a respective radio access technology. In particular, the 4G eNB 14 could be configured to provide 4G coverage on at least one 4G carrier 18, and the 5G eNB 16 could be configured to provide 5G coverage on at least one 5G carrier 20.

Each of these carriers 18, 20 could be FDD or TDD and at least on the downlink could have a respective carrier bandwidth centered on a respective center frequency, thus defining a respective frequency range extending in frequency from a respective low-end frequency to a respective high-end frequency.

Further, the respective coverage on each carrier 18, 20 could be divided over time into frames, subframes, timeslots, and symbol segments, and could be divided over the carrier's bandwidth into subcarriers. As a result, the respective coverage on each carrier could define an array of time-frequency resource elements, in which subcarriers can be modulated to carry data communications. And in each subframe, these resource elements could be divided into groups defining the PRBs noted above, which could be allocable by the associated access node on an as-needed basis to carry data communications as noted above.

Further, the 4G air interface and 4G service provided by 4G eNB 14 on the 4G carrier 18 could differ from the 5G air interface and 5G service provided by the 5G gNB 16 on the 5G carrier 20 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

Regardless of whether the 4G and 5G carriers are FDD or TDD, there could be one or more downlink transmission opportunities in which the 4G eNB 14 and 5G gNB 16 could transmit at the same time as each other. For instance, the 4G and 5G carriers could both be TDD, and the 4G eNB 14 and 5G gNB 16 could be configured to operate with the same TDD configuration (downlink-uplink sequence of subframes per frame) as each other, so that downlink subframes on the 4G carrier would occur at the same time as downlink subframes on the 5G carrier. Alternatively, there could be some variation between timing of downlink transmission on the carriers, still with some overlap in time.

Further, in line with the discussion above, at least on the downlink, the frequency range of the 4G carrier 18 on which the 4G eNB 14 is configured to operate could overlap at least partially with the frequency range of the 5G carrier 20 on which the 5G gNB 16 is configured to operate, so as to define at least one frequency-overlap area.

Figure 2:
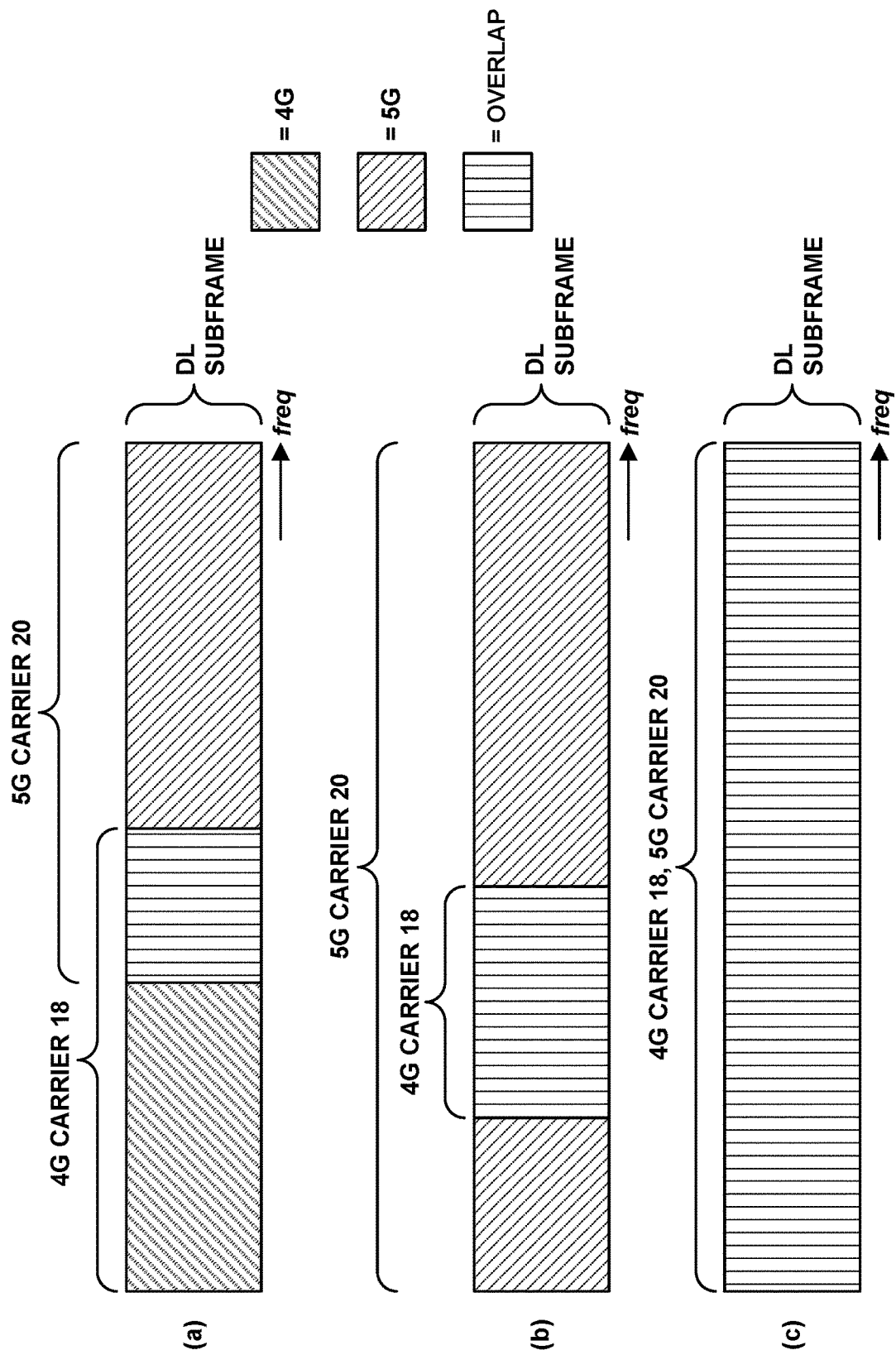
FIG. 2 is an illustration of overlapping of 4G and 5G carriers in example implementations.

FIG. 2 illustrates three non-limiting examples of such frequency overlap in an example 1-millisecond downlink subframe. Namely, as shown in example (a), the high end of the 4G carrier 18 could overlap with the low end of the 5G carrier 20, so as to define a frequency-overlap area at their overlapping ends. Alternatively, as shown in example (b), the 4G carrier 18 could be narrower than the 5G carrier 20 and defined wholly within the frequency range of the 5G carrier 20, so that the frequency range of the 4G carrier 18 defines a frequency-overlap area. And still alternatively, as shown in example (c), the 4G carrier 18 and 5G carrier 20 could have the same frequency range as each other, so that their common frequency range defines a frequency-overlap area. Other examples may be possible as well.

This frequency-overlap area could encompass one or more PRBs defined respectively on each carrier. Thus, at least one 4G PRB defined on the 4G carrier 18 could coexist in time and frequency with at least one 5G PRB defined on the 5G carrier 20. Alternatively, the frequency-overlap area could take other forms.

Turning back to FIG. 1, in the example arrangement, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26 having a serving gateway (SGW) 28 and a packet-data network gateway (PGW) 30, which provides user-plane connectivity with the transport network 24. Further, the core network includes a mobility management entity (MME) 32, which serves as a core-network controller. Other core-network arrangements are also possible.

FIG. 1 also illustrates an example UE 34 within coverage of 4G eNB 14 and 5G gNB 16. This UE could take any of the forms noted above, among other possibilities. Further, the UE could be equipped with a 4G LTE radio, a 5G NR radio, and associated circuitry and logic that enables the UEs to engage in 4G LTE service, 5G NR service, and EN-DC service.

In line with the discussion above, when UE 34 initially enters into coverage of this network, the UE could discover coverage of the 4G eNB 14 on the 4G carrier 18, such as by discovering a synchronization signal broadcast by the 4G eNB 14 on the carrier and then determining that a reference signal broadcast by the 4G eNB 14 on the carrier is strong enough to justify connecting. The UE could then engage in random-access signaling and RRC signaling with the 4G eNB 14 to establish an RRC connection, and the 4G eNB 14 could establish a context record indicating the state of the UE's 4G connection and service.

With its RRC connection established, the UE could then transmit to the 4G eNB 14 an attach request message, which the 4G eNB 14 could forward to the MME 32 for processing. And upon authenticating and authorizing the UE for service, the MME 32 and 4G eNB 14 could coordinate setup for the UE of at least one user-plane bearer. In particular, the MME 32 could engage in signaling with the 4G eNB 14 and the SGW 28 to coordinate setup for the UE of an access-bearer extending between the 4G eNB 14 and the PGW 30 via the SGW 28, and the 4G eNB 14 could engage in signaling with the UE to establish a DRB and other configuration parameters cooperatively defining a 4G connection for the UE.

As a last step of this attachment process, the 4G eNB 14 could also transmit to the UE an RRC message carrying a UE-capability enquiry, and the UE could respond to the 4G eNB 14 with a "UE capability information" information element (IE), which could indicate that the UE 34 is EN-DC capable.

The 4G eNB 14 could then work to configure EN-DC service for the UE. In line with the discussion above, for instance, the 4G eNB 14, operating as MeNB, could first engage in process to add the 5G gNB 16 as an SgNB for the UE, such as by transmitting to the 5G gNB 16 an SgNB-Addition request to cause the 5G gNB to allocate resources for a 5G connection for the UE on the 5G carrier 20, receiving an SgNB-Addition-Request acknowledge message from the 5G gNB 16, and engaging in associated RRC signaling with the UE 34, in response to which the UE 34 could then access and complete establishment of the 5G connection. Further, the 4G eNB 14 could engage in signaling as described above to transfer to the UE's access bearer to the 5G gNB as well.

The 4G eNB 14 and 5G gNB 16 could then provide the UE with EN-DC service, concurrently serving the UE over their respective connections with the UE. Namely, the 4G eNB 14 could allocate PRBs of the 4G carrier 18 as needed to carry data over the 4G connection between the 4G eNB 14 and the UE, and the 5G gNB could allocate PRBs of the 5G carrier as needed to carry data over the 5G connection between the 5G gNB 16 and the UE.

Further, in line with the discussion above, the 4G eNB 14 and 5G gNB 16 could concurrently transmit to the UE on the same frequency as each other within the frequency-overlap area of the 4G and 5G carriers 18, 20. For example, if the 4G eNB 14 has a first bit sequence to send to the UE and the 5G gNB 16 has a second bit sequence to send to the UE, the 4G eNB 14 could transmit the first bit sequence to the UE in the resource elements of a 4G PRB within in a downlink subframe on the 4G carrier 18, and the 5G gNB 16 could concurrently transmit the second bit sequence to the UE in the resource elements of a 5G PRB that is defined in the same downlink subframe of 5G carrier 20 and that overlaps partially or fully in frequency with the 4G PRB.

At each of one or more moments in time, such as in each of one or more symbol time segments or the like, transmission of at least a portion of the first bit sequence from the 4G eNB 14 to the UE would thus occur on the same frequency as transmission of at least a portion of the second bit sequence from the 5G gNB 16 to the UE. Therefore, the UE would receive on that frequency a combination of the transmissions from the 4G eNB 14 and the 5G gNB 16. To enable the UE to uncover each of the underlying first and second bit sequences in this scenario, as noted above, the respective bit sequences from the 4G eNB 14 and 5G gNB 16 could orthogonally encoded with binary orthogonal codes $C_1$, $C_2$. These binary codes could be orthogonal to each other in that they would have zero cross-correlation with each other. For instance, the codes could be Walsh codes or other orthogonal codes.

By way of example, the 4G eNB 14 could encode the first underlying bit sequence $ULBS_1$ with a binary orthogonal code $C_1$ so as to produce a first encoded bit sequence and could transmit the first encoded bit sequence to the UE in the resource elements of the 4G PRB. And the 5G gNB 16 could encode the second underlying bit sequence $ULBS_2$ with a second binary orthogonal code $C_2$ so as to produce a second encoded bit sequence and could transmit the second encoded bit sequence to the UE in the resource elements of the 5G PRB.

As these two encoded bit sequences would be transmitted at least partially on the same frequency as each other, the UE may thus receive a combination of the two encoded bit sequences. To uncover each underlying bit sequence, the UE could then use the same binary orthogonal codes $C_1$, $C_2$. For example, the UE could apply the first binary orthogonal code $C_1$ to the received combination to extract the first underlying bit sequence $ULBS_1$ transmitted from the 4G eNB 14, and the UE could apply the second binary orthogonal code $C_2$ to the received sum to extract the second underlying bit sequence $ULBS_2$ transmitted from the 5G gNB 16. To facilitate this, when the 4G eNB 14 schedules transmission of a first bit sequence to the UE on one or more 4G PRBs of the frequency-overlap area of 4G carrier 18 and 5G carrier 20, the 4G eNB 14 could notify the UE that the 4G eNB 14 has orthogonally encoded the transmission on the one or more 4G PRBs. For instance, the 4G eNB 14 could indicate this in the scheduling directive that the 4G eNB 14 sends to the UE to schedule transmission in the 4G PRB(s) and could possibly specify the first orthogonal code $C_1$ there as well. The UE could thereby learn that the transmission from the 4G eNB 14 in the 4G PRB(s) has been orthogonally encoded and could accordingly decode that transmission to uncover the underlying first bit sequence.

Likewise, when the 5G gNB 16 schedules transmission of a second bit sequence to the UE on one or more 5G PRBs of the frequency-overlap area, the 5G gNB 16 could notify the UE that the 5G gNB 16 has orthogonally encoded the transmission on the one or more 5G PRBs. For instance, the 5G gNB 16 could indicate this in the scheduling directive that the 5G gNB 16 sends to the UE to schedule transmission in the 5G PRB(s) and could possibly specify the first orthogonal code $C_1$ there as well. The UE could thereby learn that the transmission from the 5G gNB 16 in the 5G PRB(s) has been orthogonally encoded and could accordingly decode that transmission to uncover the underlying second bit sequence.

In an example implementation, without limitation, the act of encoding each underlying bit sequence with a binary code could involve XOR'ing (applying the logical XOR operation to) successive bits of the bit sequence with the binary code. For instance, if the binary code is eight bits long, the access node could XOR every eight bits of the bit sequence with the binary code. In turn, the act of extracting an underlying bit sequence from the combination of the encoded bit sequences could similarly involve XOR'ing the combined bit sequence with the same binary code. Alternatively, the encoding and decoding could take other forms.

Figure 3:
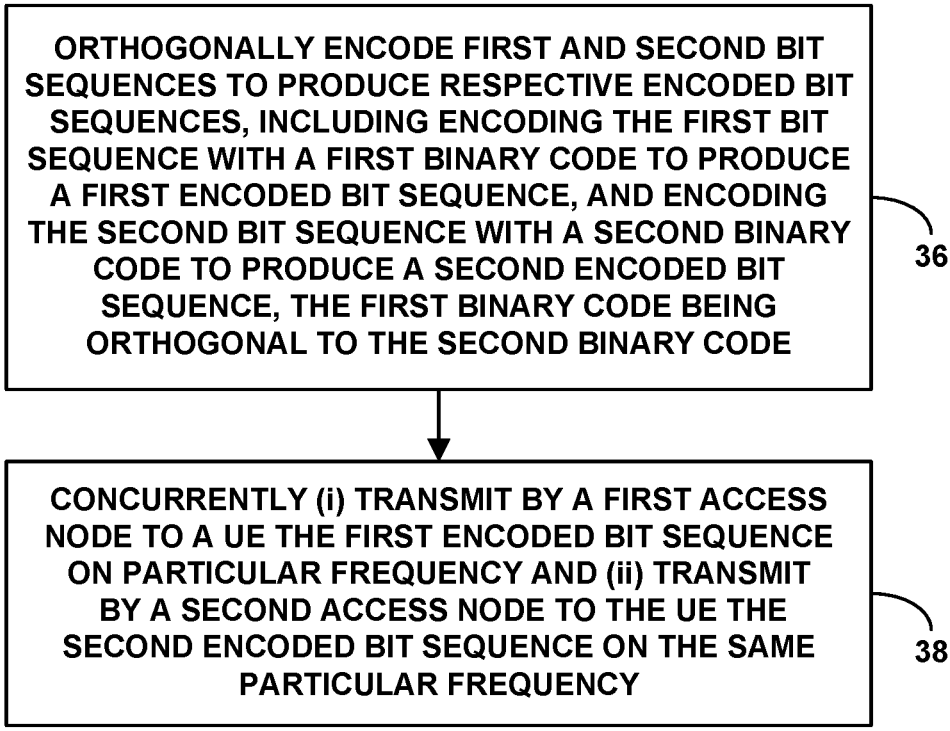
FIG. 3 is flow chart depicting an example method in accordance with the disclosure.

FIG. 3 is a flow chart depicting a method that can be carried out to facilitate concurrent transmission of (i) a first bit sequence from a first access node to a UE and (ii) a second bit sequence from a second access node to the UE, when the first access node serves the UE according to a first RAT and the second access node serves the UE according to a second RAT. As shown in FIG. 3, at block 36, the method includes orthogonally encoding the first and second bit sequences to produce respective encoded bit sequences, including encoding the first bit sequence with a first binary code to produce a first encoded bit sequence, and encoding the second bit sequence with a second binary code to produce a second encoded bit sequence, the first binary code being orthogonal to the second binary code. And at block 38, the method includes concurrently (i) transmitting by the first access node to the UE the first encoded bit sequence on particular frequency and (ii) transmitting by the second access node to the UE the second encoded bit sequence on the same particular frequency.

In line with the discussion above, the first binary code and second binary code could have zero cross-correlation with each other. For instance, the first and second binary codes could be Walsh codes, among other possibilities.

Further, as discussed above, the act of encoding the first bit sequence with the first binary code could involve XOR'ing sequential groups of bits of the first binary sequence with the first binary code, and the act of encoding of the second bit sequence with the second binary code could involve XOR'ing sequential groups of bits of the second bit sequence with the second binary code.

And still further, as discussed above, the act of encoding the first bit sequence with the first binary code to produce the first encoded bit sequence could be carried out by the first access node, and the act of encoding the second bit sequence with the second binary code to produce the second encoded bit sequence could be carried out by the second access node.

Yet further, as discussed above, the method could be carried out when the first access node and the second access node are serving the UE with dual-connectivity on the first RAT and the second RAT, and particularly with the first access node serving the UE on a first carrier according to the first RAT, the second access node serving the UE on a second carrier according to the second RAT. For example, the method could be carried out in the arrangement of FIG. 1, with the first access node being the 4G eNB 14, with the second access node being the 5G gNB 16, and with the access nodes serving the UE with EN-DC on their respective 4G and 5G carriers 18, 20.

As noted, the first carrier could overlap in frequency with the second carrier to define a frequency-overlap area, and the particular frequency could be within the frequency-overlap area. For instance, the particular frequency could comprise frequency of a common PRB within the frequency-overlap area.

And as also noted above, the first access node and second access node could be collocated, in which case the act of concurrent transmitting the first and second encoded sequences could occur from a common location of the first access node and the second access node.

Figure 4:
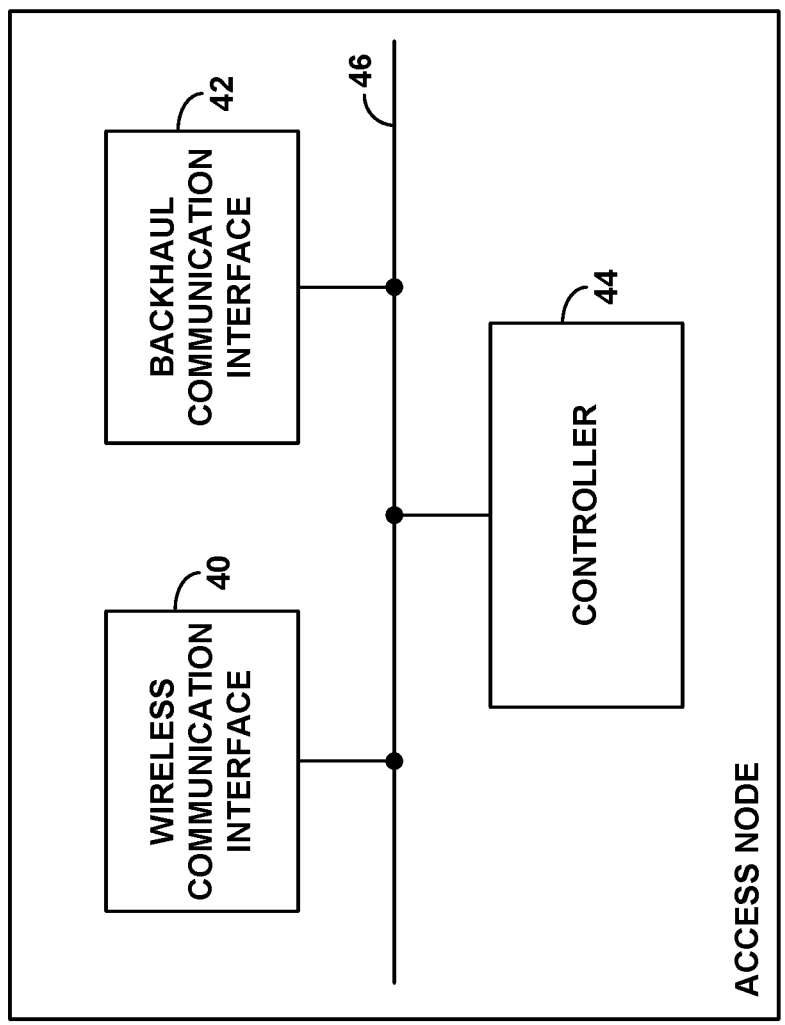
FIG. 4 is a simplified block diagram of an example access node operable in accordance with the disclosure.

FIG. 4 is next a simplified block diagram of an example access node, showing some of the components that could be included in the access node in a non-limiting example implementation. This access node could represent the 4G eNB 14 or 5G gNB 16 discussed above, for instance.

As shown, the example access node includes a wireless communication interface 40, a backhaul communication interface 42, and a controller 44, which could be integrated together in various ways (e.g., on a chipset) and/or interconnected by a system bus, network, or other communication mechanism 46 as shown.

The wireless communication interface 40 could include a radio and antenna structure through which the first access node could be configured to engage in air-interface communication and serve UEs according to a first RAT. And the backhaul communication interface 42 could comprise a wired or wireless network communication module, such as an Ethernet interface, through which to communicate with other entities, perhaps with the second access node and/or with one or more other entities on or via a core network.

Further, the controller 44 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to carry out, or cause the access node to carry out, various operations as described herein.

In line with the discussion above, a wireless communication system could include a first such access node configured to provide wireless communication service on a first carrier according to a first RAT and a second such access node configured to provide wireless communication service on a second carrier according to a second RAT, the first access node and second access node being collocated, and the first and second carriers overlapping in frequency to define a frequency-overlap area.

As discussed above, the first access node and second access node could thus be configured to orthogonally encode bit sequences for their respective transmission to a user equipment device, including the first access node encoding a first bit sequence with a first binary code to produce a first encoded bit sequence and the second access node encoding a second bit sequence with a second binary code to produce a second encoded bit sequence, with the first binary code being orthogonal to the second binary code.

Further, the first access node and second access node could be configured to concurrently transmit to the UE the first encoded bit sequence and second encoded bit sequence on a common frequency in the frequency-overlap area, including the first access node transmitting the first encoded bit sequence to the UE on the common frequency and the second access node concurrently transmitting the second encoded bit sequence to the UE on the common frequency.

Various other features discussed above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for concurrent transmission of (i) a first bit sequence from a first access node to a user equipment device (UE) and (ii) a second bit sequence from a second access node to the UE, when the first access node serves the UE according to a first radio access technology (RAT) and the second access node serves the UE according to a second RAT, the method comprising:
orthogonally encoding the first and second bit sequences to produce respective encoded bit sequences, including encoding the first bit sequence with a first binary code to produce a first encoded bit sequence and encoding the second bit sequence with a second binary code to produce a second encoded bit sequence, wherein the first binary code is orthogonal to the second binary code; and
concurrently (i) transmitting by the first access node to the UE the first encoded bit sequence on particular frequency and (ii) transmitting by the second access node to the UE the second encoded bit sequence on the same particular frequency.

2. The method of claim 1, wherein the first binary code and second binary code have zero cross-correlation with each other.

3. The method of claim 2, wherein the first and second binary codes are Walsh codes.

4. The method of claim 1,
wherein encoding of the first bit sequence with the first binary code comprises XOR'ing sequential groups of bits of the first binary sequence with the first binary code, and
wherein encoding of the second bit sequence with the second binary code comprises XOR'ing sequential groups of bits of the second bit sequence with the second binary code.

5. The method of claim 1, wherein the method is carried out when the first access node and second access node are serving the UE with dual-connectivity on the first RAT and second RAT.

6. The method of claim 5, wherein the first RAT is 4G LTE, the second RAT is 5G NR, and the dual-connectivity is EUTRA-NR Dual-Connectivity (EN-DC).

7. The method of claim 1,
wherein encoding the first bit sequence with the first binary code to produce the first encoded bit sequence is carried out by the first access node, and
wherein encoding the second bit sequence with the second binary code to produce the second encoded bit sequence is carried out by the second access node.

8. The method of claim 1, wherein the first access node and second access node are collocated, and wherein the concurrent transmitting occurs from a common location of the first access node and the second access node.

9. The method of claim 1, wherein the first access node serves the UE on a first carrier according to the first RAT, wherein the second access node serves the UE on a second carrier according to the second RAT, wherein the first carrier overlaps in frequency with the second carrier to define a frequency-overlap area, and wherein the particular frequency is in the frequency-overlap area.

10. The method of claim 1, wherein the particular frequency comprises frequency of a common physical resource block.

11. A wireless communication system comprising:
a first access node configured to provide wireless communication service on a first carrier according to a first radio access technology (RAT); and
a second access node configured to provide wireless communication service on a second carrier according to a second RAT, wherein the first access node and second access node are collocated, and wherein the first and second carriers overlap in frequency to define a frequency-overlap area,
wherein the first access node and second access node are configured to orthogonally encode bit sequences for their respective transmission to a user equipment device, including the first access node encoding a first bit sequence with a first binary code to produce a first encoded bit sequence and the second access node encoding a second bit sequence with a second binary code to produce a second encoded bit sequence, wherein the first binary code is orthogonal to the second binary code, and
wherein the first access node and second access node are configured to concurrently transmit to the UE the first encoded bit sequence and second encoded bit sequence on a common frequency in the frequency-overlap area, including the first access node transmitting the first encoded bit sequence to the UE on the common frequency and the second access node concurrently transmitting the second encoded bit sequence to the UE on the common frequency.

12. The wireless communication system of claim 11, wherein the first binary code and second binary code have zero cross-correlation with each other.

13. The wireless communication system of claim 2, wherein the first and second binary codes are Walsh codes.

14. The wireless communication system of claim 11,
wherein encoding of the first bit sequence with the first binary code comprises XOR'ing sequential groups of bits of the first binary sequence with the first binary code, and
wherein encoding of the second bit sequence with the second binary code comprises XOR'ing sequential groups of bits of the second bit sequence with the second binary code.

15. The wireless communication system of claim 11, wherein the orthogonal encoding and concurrent transmission are carried out when the first access node and second access node are serving the UE with dual-connectivity on the first RAT and second RAT.

16. The wireless communication system of claim 15, wherein the first RAT is 4G LTE, the second RAT is 5G NR, and the dual-connectivity is EUTRA-NR Dual-Connectivity (EN-DC).

17. The wireless communication system of claim 11, wherein the concurrent transmitting occurs from a common location of the first access node and the second access node.

18. The wireless communication system of claim 11, wherein the common frequency comprises frequency of a common physical resource block.

* * * * *